United States Patent [19]
Jamieson et al.

[11] Patent Number: 5,343,003
[45] Date of Patent: Aug. 30, 1994

[54] RECALIBRATION OF HITCH LOAD WEIGHING USING DYNAMIC TARE

[75] Inventors: Eric K. Jamieson, Farmington; Richard C. McCarthy, Simsbury; Young S. Yoo, Avon, all of Conn.

[73] Assignee: Otis Elevator Company, Farmington, Conn.

[21] Appl. No.: 891,482

[22] Filed: May 29, 1992

[51] Int. Cl.$^5$ .................. B66B 3/00; G01G 19/14; G01G 19/52
[52] U.S. Cl. ................ 187/131; 187/133; 177/132
[58] Field of Search ............. 187/131, 133; 177/132, 177/16, 50

[56] References Cited
U.S. PATENT DOCUMENTS

| | | |
|---|---|---|
| 4,330,836 | 5/1982 | Donofrio et al. .......... 364/567 |
| 4,674,605 | 6/1987 | McPherson .............. 187/131 |
| 4,793,442 | 12/1988 | Heckler et al. . |
| 4,939,679 | 7/1990 | David ............. 364/571.04 |
| 5,119,893 | 6/1992 | Jost ................. 177/16 |

FOREIGN PATENT DOCUMENTS 2055207  2/1981  United Kingdom ......... 187/133

Primary Examiner—R. Skudy
Assistant Examiner—Robert Nappi
Attorney, Agent, or Firm—Breffni X. Baggot

[57] ABSTRACT

A single load cell 10 both (A) measures the load on a elevator hitch providing an analog elevator load signal on line 11 to an analog-to-digital converter 20 via line 18, for providing a digital elevator load signal and (B) is used for providing a dynamic tare of elevator load weighing system for calibrating the analog-to-digital converter 20 by adjusting an analog reference voltage ($V_{ref}$) until the digital elevator load signal is equal to the dynamic tare.

2 Claims, 7 Drawing Sheets

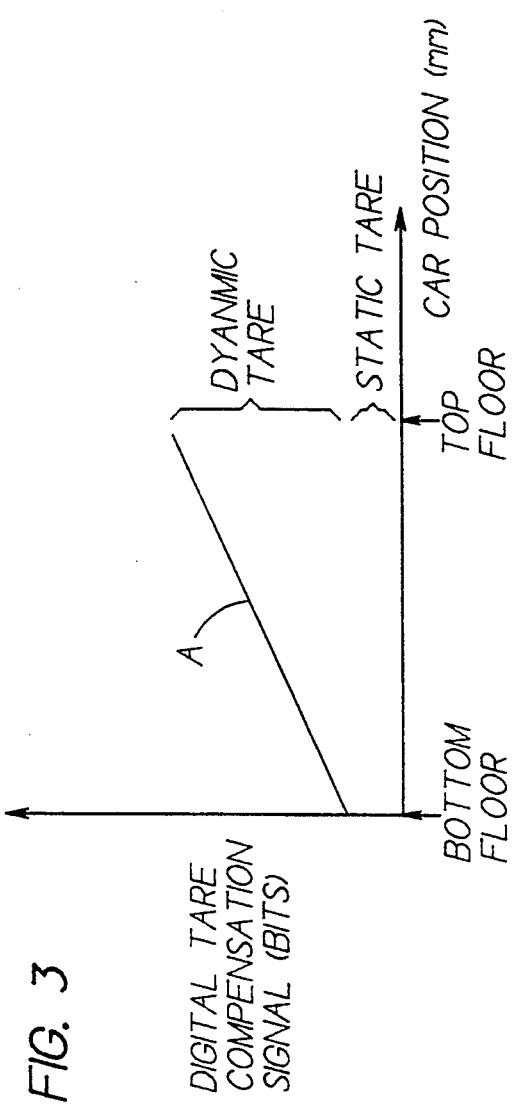
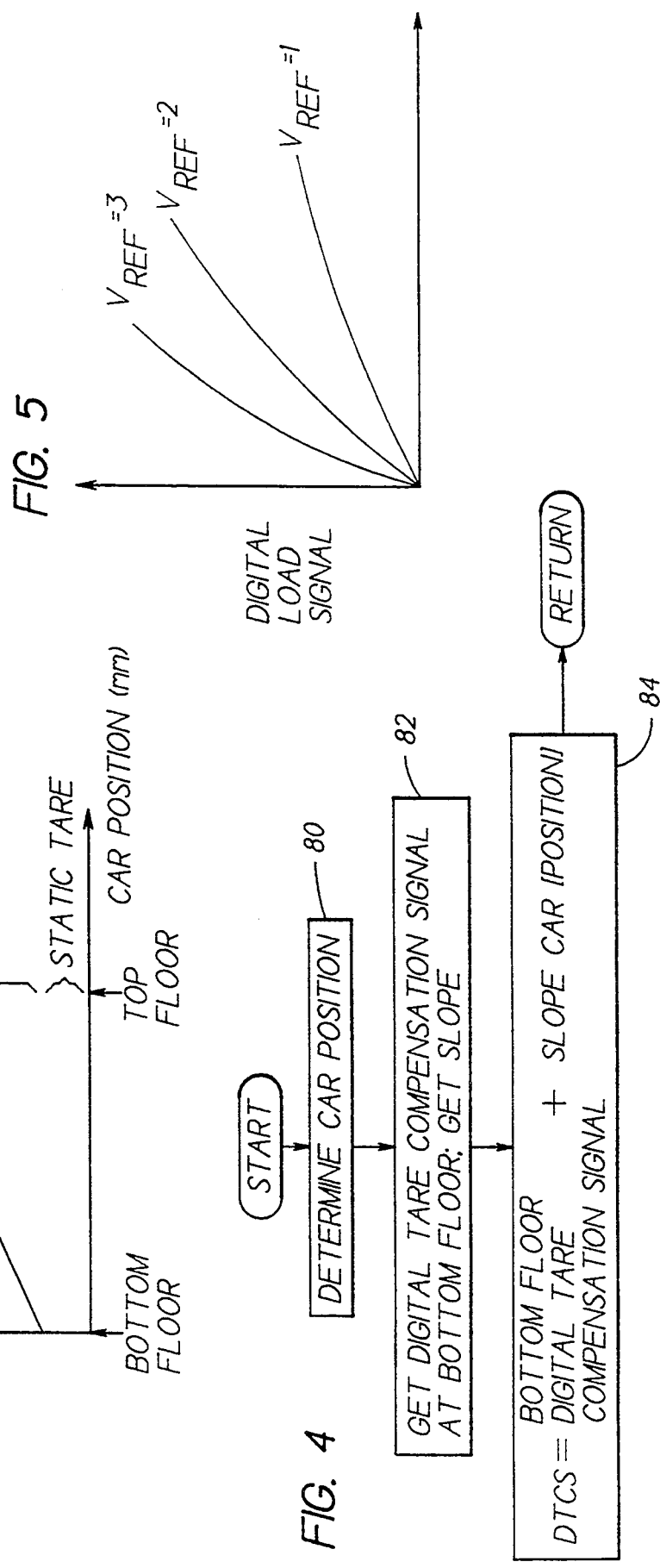
FIG. 3
FIG. 4
FIG. 5

FIG. 7
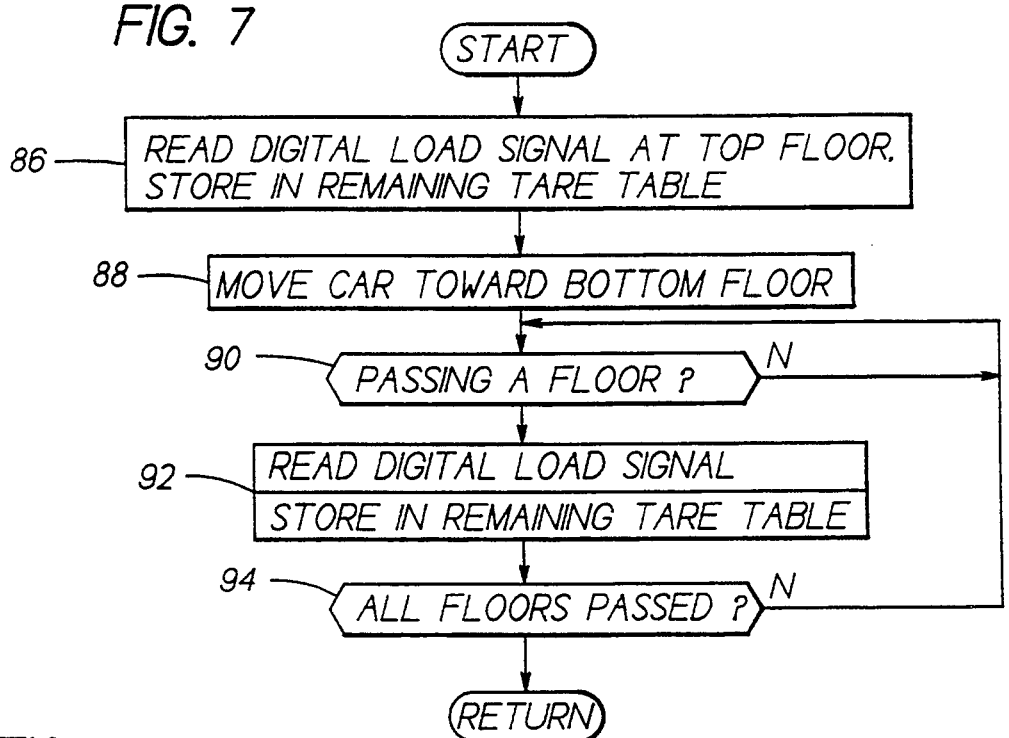
FIG. 8
| FLOOR | REMAINING TARE |
|---|---|
| 1 | EMPTY CAR DIGITAL LOAD SIGNAL AT a |
| 2 | " · |
| 3 | " |
| 4 | " · |
| 5 | " |
| 6 | " |
| 7 | " g |
FIG. 9
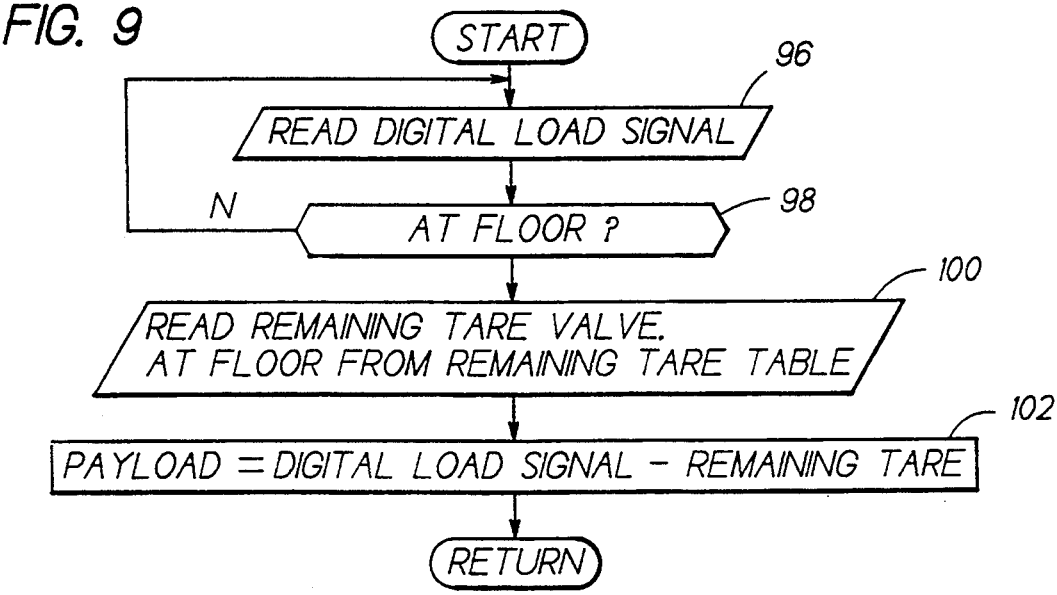

5,343,003

RECALIBRATION OF HITCH LOAD WEIGHING USING DYNAMIC TARE

TECHNICAL FIELD

This invention relates to automatically recalibrating an elevator hitch load weighing system.

INCORPORATION BY REFERENCE

Co-pending application Ser. No. 07/891,491 "Elevator Hitch Load Weighing Tare Compensation" is herein incorporated by reference.

BACKGROUND OF THE INVENTION

Many elevator cars are equipped with sensors that provide load signals to the elevator controller indicative of the elevator car weight. The measured weight can be used by the controller to precisely pretorque the motor prior to releasing the brake, to implement dispatching strategies, such as bypassing hall calls when the car is full, or indicating an overload condition. For bypassing hall calls or indicating an overload condition, the load signal is compared with a predetermined load value stored in the elevator controller.

Many sensor systems are subject to drift over long periods of time, resulting in the need for calibration. In the context of elevator car load weighing, sensor drift can result in jerky starts when the motor is incorrectly pretorqued. This can also result in the improper implementation of dispatching strategies, such as hall call bypass when the car is not fully loaded.

The usual method of calibrating the load sensors is for service personnel to bring a calibration weight to the building, and measure the sensor signals under different load conditions. This method requires putting the massive calibration weight on a weight cart and usually wheeling it over the lobby carpet to the elevator car. This wears out the carpet as well as the mechanic assigned to recalibrate the load weighing system.

Not only are weight carts needed for calibration, worse, they are needed for recalibration. The need for recalibration might be observed when the car 2 experiences roll back or roll forward. A passenger in the car may observe roll back when he sees the car move just before the doors close. Roll back occurs when the car rolls in a direction opposite to the direction of travel to the next landing. Roll forward occurs when the car lurches in the same direction that the car takes when it moves to service the next landing. Both are caused by improper pretorquing of the motor. The motor is normally pretorqued so that when the brake is lifted, the car does not move. However, for the proper amount of armature current to be applied the car load must be known. If it is not, too much or too little pretorque is applied and roll back or roll forward occurs.

One way to recalibrate without bringing a calibration weight back to the elevator site is to leave it there when calibrating. This is described in U.S. Pat. No. 4,674,605, "Automatic Elevator Load Sensor Calibration System". There, an empty elevator car is caused to lift a predetermined calibration weight located above the normal car excursion, above the top floor. The car load sensor output before and after lifting the calibration weight, together with the known values for the empty car weight and the calibration weight, are used to recalibrate the load versus signal function. While this system avoids the need for hauling a calibration weight from outside the building into the building to calibrate the load weighing system, it requires a calibration weight for each shaft and room above the normal floor excursion to store that calibration weight.

DISCLOSURE OF THE INVENTION

An object of the present invention is to calibrate an elevator hitch load weighing system without a calibration weight.

This invention is predicated on the observation that whereas calibration of an elevator load weighing system usually requires manually putting calibration weights into the car and for recalibration returning to manually putting calibration weights into the car, in hitch load weighing the dynamic tare can be used as a recalibration standard.

According to the present invention, dynamic tare is measured and used to recalibrate an elevator hitch load weighing system.

The advantage of the invention is that when the load weighing system is recalibrated no one has to drag a calibration weight into the building. Instead, the elevator system itself is used to calibrate its own load weighing system.

BRIEF DESCRIPTION OF THE DRAWINGS

FIG. 3 is a graph of hoistway position versus tare;

FIG. 4 is a logic diagram for compensating tare according to the rule described in FIG. 2;

FIG. 5 is a graph of various transfer functions, for the ADC 20, corresponding to various values of $V_{ref}$;

FIG. 7 is a logic diagram for building a remaining tare table;

FIG. 8 is a remaining tare table;

FIG. 9 is a logic diagram for subtracting digital stored load signal from a digital load signal;

BEST MODE FOR CARRYING OUT THE INVENTION TARE COMPENSATION

Tare can have three values Static tare is the tare in a load measurement taken when a car 2 is at the first floor. Dynamic tare is the tare in a load measurement everywhere else which varies as the ascending/descending car carries an increasing/decreasing amount of traveling cable and compensating rope is called the dynamic tare. Remaining tare is the tare left in a compensated load signal on a line 18 after a first pass at subtracting tare from the load measurement has been made by a partial tare compensator 24.

Figure 1:
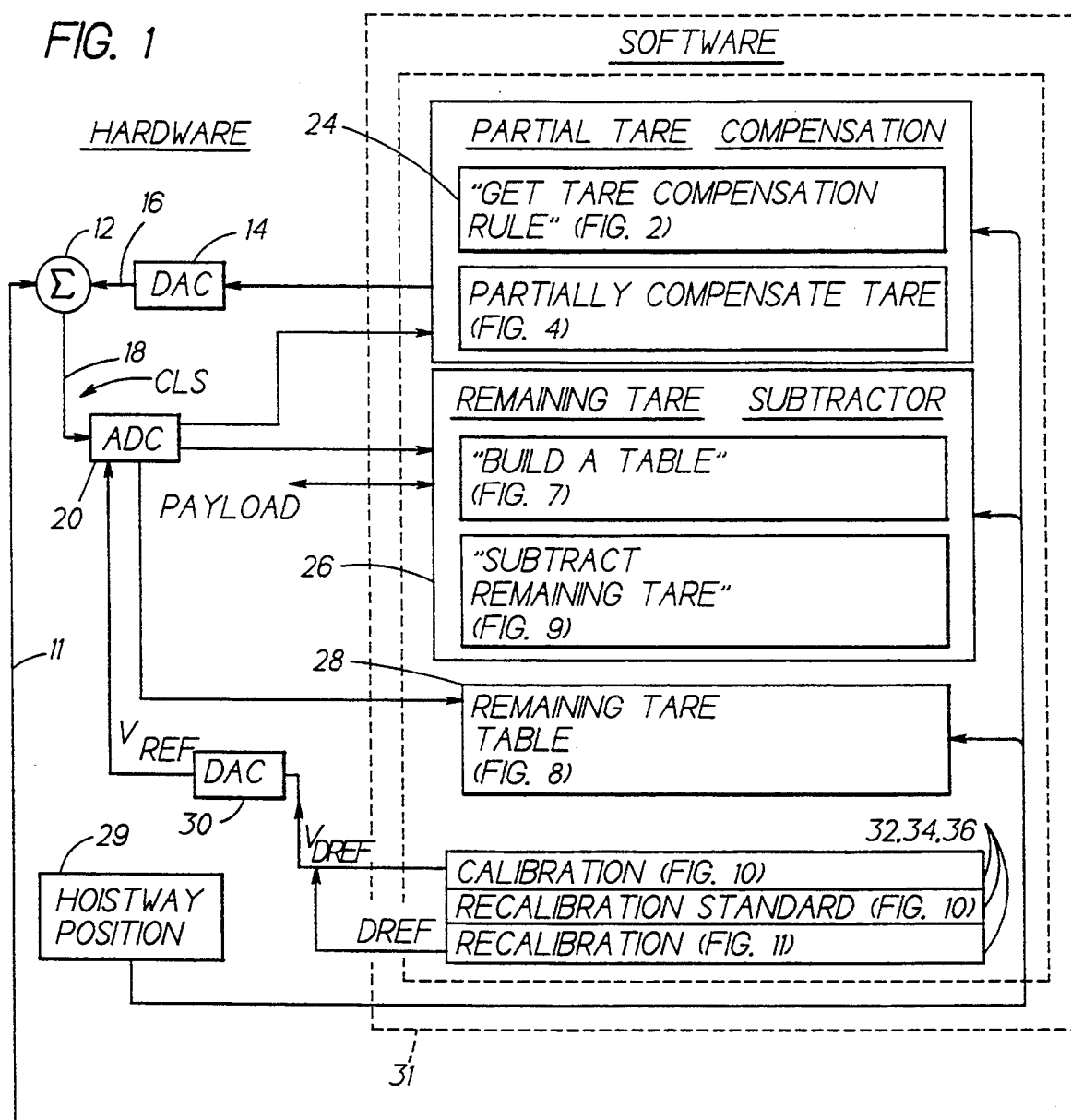
FIG. 1 is a front view of an elevator hitch load weighing assembly with a block diagram illustrating the invention.
Figure 2:
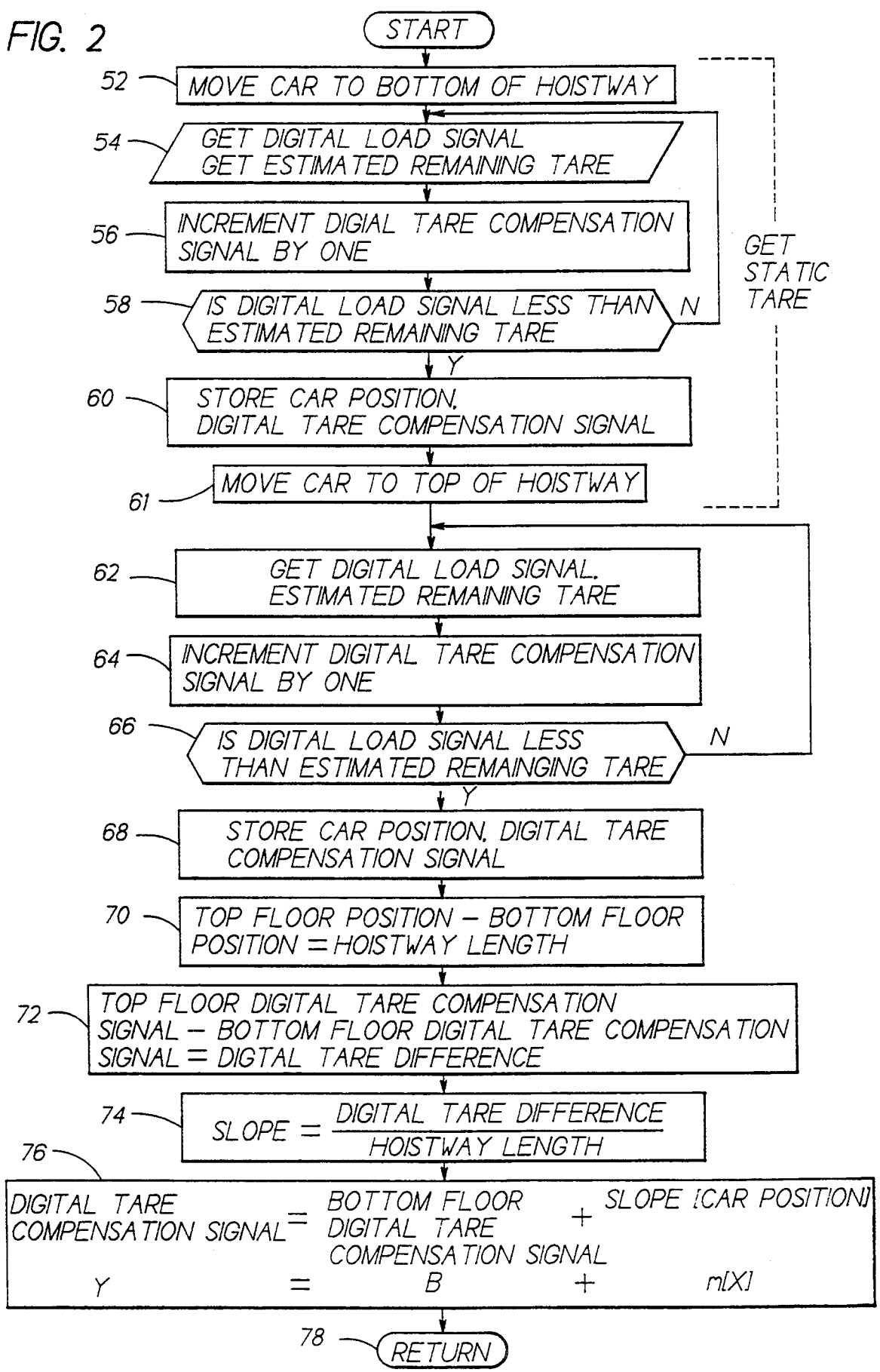
FIG. 2 is logic diagram for obtaining a rule for partially compensating tare.
Figure 10:
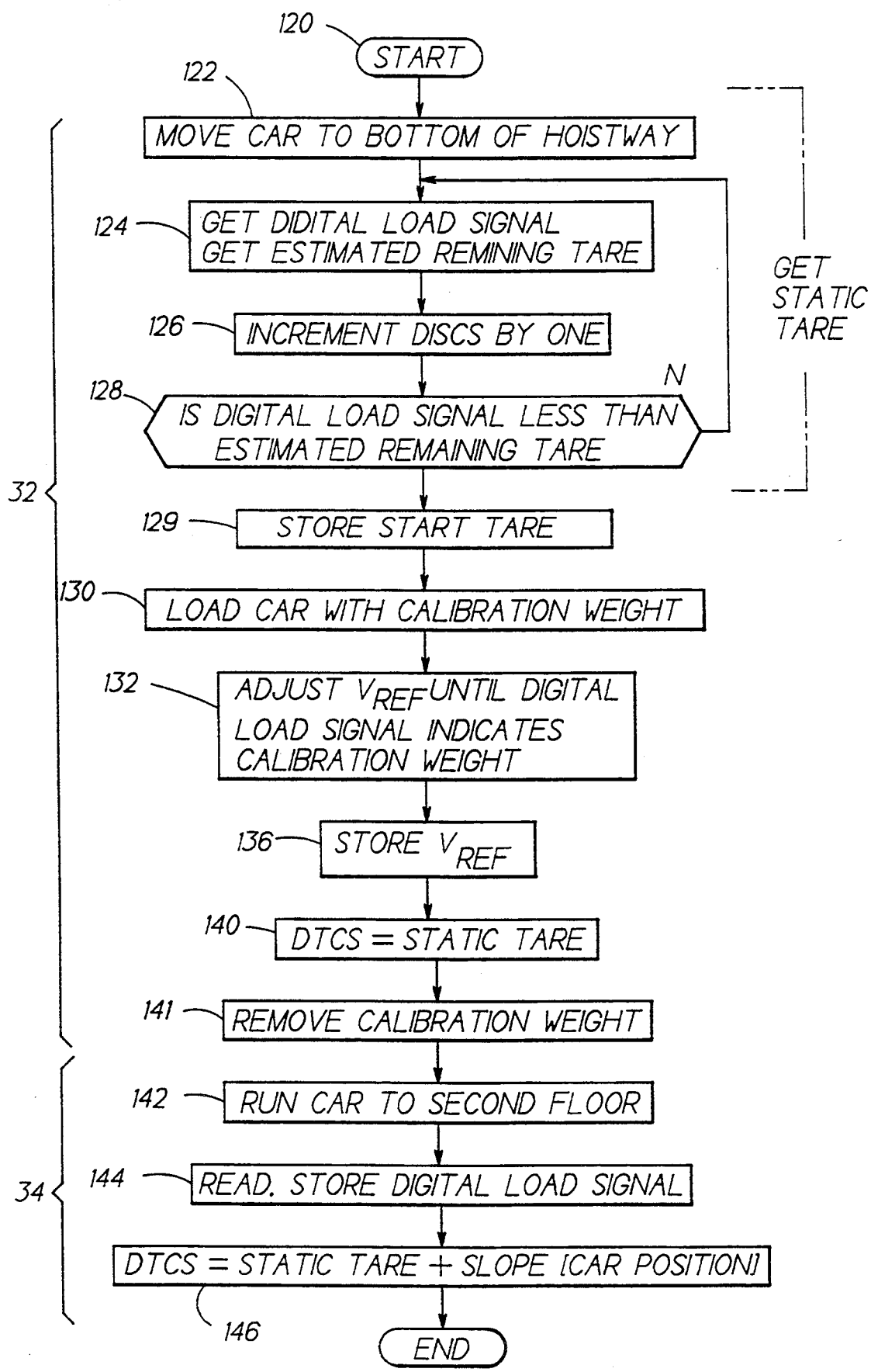
FIG. 10 is a flow chart for the calibration of the load weighing system of FIG. 1 and obtaining a recalibration standard for calibration of the load weighing system of FIG. 1.

FIG. 1 shows a car 2 in a hoistway 4. Hanging from the car 2 is a compensating rope 6. Power is supplied to the car 2 by a traveling cable 8. A load cell 10 provides an analog load signal (ALS) on a line 11 to a summer 12 where an analog tare compensation signal (ATCS), provided by a digital-to-analog converter (DAC) 14 on a line 16, is added so that a compensated load signal (CLS) is provided on a line 18 to an analog to digital converter (ADC) 20. The ADC 20 provides a digital load signal (DLS) to a partial tare compensator 24, a remaining-tare subtractor 26, and a remaining-tare table 28. The partial tare compensator 24 makes a first pass at removing tare and partially eliminates it in the load signal prior to analog-to-digital (A to D) conversion (at the DAC 14) while the remaining tare subtractor 26 makes a second pass, eliminating tare remaining after A to D conversion. The partial tare compensator 24 is responsive to the digital load signal and the car position, provided by a hoistway position means 29, and provides a digital tare compensation signal (DTCS) to the DAC 14. The remaining tare subtractor 26 is responsive to the position of the car 2, the digital load signal, a stored floor, and a digital stored load signal for providing a payload. The remaining tare table 28 is responsive to the digital load signal and car position and stores the digital load signal at every floor. The partial tare compensator 24 includes two blocks: "GET TARE COMPENSATION RULE" and "PARTIALLY COMPENSATE TARE" which are further shown in the logic diagrams of FIGS. 2, 4, respectively. Similarly, the remaining tare subtractor 26 includes two blocks "BUILD A TABLE" and "SUBTRACT REMAINING TARE" which are shown in FIGS. 8, 10, respectively. The routines of FIGS. 2, 4 constitute a first pass at compensating tare which yields a partial compensation of the tare. The routines of FIGS. 8, 10 constitute a second pass at compensating tare and subtract out the tare remaining after the routines of FIGS. 2, 4 are executed.

The partial tare compensator 24 and remaining tare subtractor 26 serve to eliminate electronic offset inherent in the imperfections of the circuitry of the load weighing system. Electronic offset may be provided by the load cell 10 if it provides a non-zero analog load signal (ALS) when there is no load on it. Similarly, offset causes the summer 16 to provide a non-zero sum in response to zero-valued analog load and analog tare compensation signals (ARS, ATCS). The partial tare compensator 24 eliminates most of this electronic offset and the remaining tare subtractor 26 eliminates what offset remains.

The ADC 20 is responsive to an analog reference voltage $V_{ref}$ provided by a second DAC 30 itself responsive to a digital reference voltage $V_{dref}$.

$V_{ref}$ defines the transfer function of the ADC, that the number of analog volts of the analog load signal that will translate into digital bits of the digital load signal produced by the ADC. The transfer function of the ADC is a line passing through zero. The value of $V_{ref}$ determines the slope of the line. FIG. 5 shows various values of $V_{ref}$.

$V_{dref}$ is provided by a calibration section in the computer 31. The computer 31 contains three software sections: an original calibration section 32, a recalibration standard section 34, and a recalibration section 36. The purpose of the original calibration section 32 is to calibrate the load weighing system of FIG. 1 when the elevator car 2 is installed using a calibration weight 38 as the original standard by which to calibrate the load weighing system of FIG. 1. The purpose of the recalibration standard section 34 is to establish a standard by which to calibrate the load weighing system in the future, providing a future standard of recalibration. The purpose of the recalibration section is to recalibrate the load weighing system of FIG. 1 using the future standard. The original calibration standard section 32, recalibration standard section 34 and recalibration standard section 36 are further described in FIGS. 9, 10 and 11 respectively.

FIG. 2 is a logic diagram executable in a computer 31, "GET A TARE COMPENSATION RULE". Empirical studies have indicated that the relationship between the tare and car position is linear. Therefore, the rule for tare compensation is the equation for a line. Two points determine a line. A first hoistway run from the bottom floor to the top floor is made (FIG. 2) with car 2 empty. Measuring the analog load signal at those two floors gives two load measurements at two positions and therefore two points. For the routines of FIGS. 2, 7, 10 and 11, the car 2 must be empty. For the routines of FIGS. 4 and 9, the car 2 may run normally with passengers.

After START, step 50, the static tare, a y intercept for the line, is determined. This entails running an empty car 2 to the bottom of the hoistway 4, step 52, obtaining an estimated remaining tare and the digital load signal, step 54, and incrementing the DTCS by means of partial tare compensator 24 until the digital load signal from the ADC 20 is one bit less than the estimated remaining tare, steps 56, 58. Because car 2 is empty, the digital load signal indicates tare: (a) at the first floor, and prior to execution of the FIG. 4 routine, it indicates static tare, (b) elsewhere, and prior to execution of the FIG. 4 routine, it indicates dynamic tare, (c) after execution of the FIG. 4 routine, it indicates remaining tare. The estimated remaining tare is empirically obtained and approximates the absolute value of waveform B, FIG. 6.

A second point is needed to define the line. The car position at the bottom floor is measured in millimeters and the DTCS is stored, step 60. Next, the car is run to a second floor, at the top of the hoistway, step 61. The digital load signal and estimated remaining tare are obtained, step 62. The DTCS is incremented until the digital load signal is less than the estimated remaining tare, steps 64, 66. Car position and DTCS are stored, step 68.

Then, the bottom floor car position is subtracted from the top floor car position, step 70. The difference is the hoistway length. Next, the bottom floor DTCS is subtracted from the top floor DTCS and a digital tare difference is obtained thereby, step 72. Then, the digital tare difference is divided by the length, step 74. The quotient is a slope.

FIG. 3 shows tare plotted as a function of car position. The slope, multiplied by car position, plus the DTCS for the static tare, gives the Tare Compensation Rule: the equation of waveform A of FIGS. 3, 6, step 76. START is returned to, step 78.

A second logic diagram, "PARTIALLY COMPENSATE TARE" in FIG. 4 starts running when the car 2 is at the top of the hoistway FIG. 4; the logic diagram uses the logic diagram of FIG. 2 and requires determining the car position, step 80, determining the DTCS at the bottom floor, determining the slope, step 82, and using those values in the rule to obtain DTCS, step 84. Then START (FIG. 1) is returned to. DTCS is continuously provided by the partial tare compensator 24 (FIG. 1) as the car 2 travels up and down in the hoistway 4 and an analog tare compensation signal subtracted from the analog load signal at the summer 12.

If the car 2 is empty and runs from the bottom to the top again while tare is compensated according to the above rule, tare is compensated but only in discontinuous increments rather than smoothly; tare remains uncompensated between DTCS increments, in the event car 2 is going up, or decrements, in the event car 2 is going down. A graph of tare as a function of car position is shown as waveform B in FIG. 6. Waveform A from FIG. 3 is also shown. As can be seen at the first floor, after the partial tare compensator 24 has made a first pass at compensating tare, the digital load signal, which is indicative of tare, has a non-zero value for a given DTCS. See point "a" of waveform A. As car 2 ascends and the rule for compensating tare is followed, DTCS is incremented, and the empty car digital load signal returns to zero (for example, between floors 1 and 2). Thereafter, and until DTCS is next incremented, the tare is only partially compensated.

Between DTCS increments and decrements, the slopes of waveforms A and B are the same. The empty car digital load signal values a,b,c,d,e,f,g are the ordinate values for the points a, b, c, d, e, f, g on waveform B at a floor.

Figure 6:
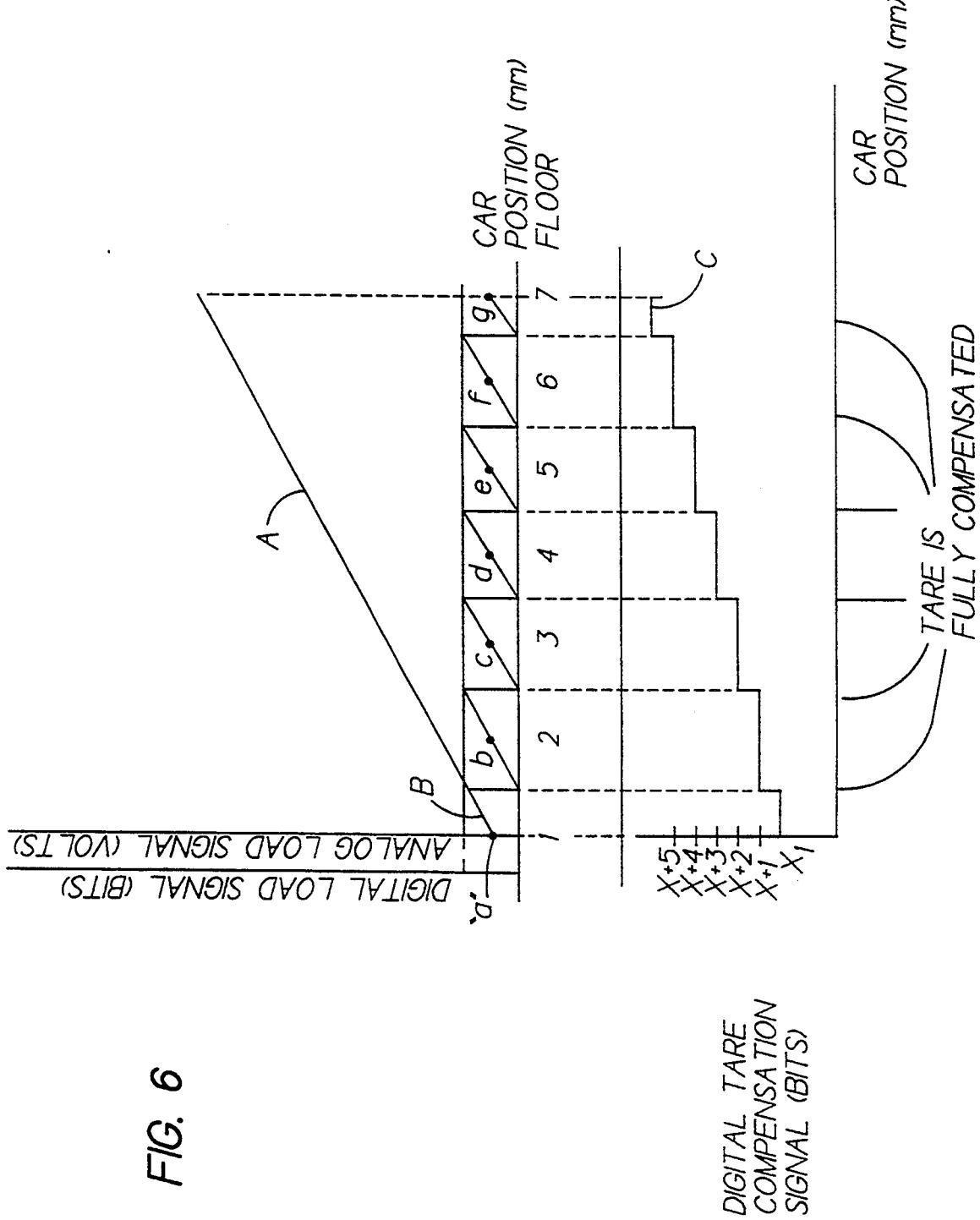
FIG. 6 is a graph of floor position versus tare and digital load signal and floor position versus digital tare compensation signal (DTCS) on the same time line.

FIG. 6 shows DTCS as a function of floor position. DTCS is waveform C. X is the value of DTCS at the first floor. Tare is fully compensated only at the instant of ("TARE IS FULLY COMPENSATED") incrementing or decrementing DTCS.

It is desired to compensate fully, rather than partially, the tare at the floors—where passengers enter and leave and where load weight accuracy is most important. The way to do this is to find out the tare remaining after the partial tare compensator 24 has done its work during a second hoistway run, then, during normal operation, subtracting that from the digital load signal. FIG. 7 shows a routine for acquisition of the remaining tare at each floor during an empty car run from top to bottom and storing it in a remaining tare table. FIG. 7 shows the remaining tare table. FIG. 8 charts a method for subtracting remaining tare, during normal operation, at each floor. Then, START (FIG. 1) is returned to.

Step 86 of the FIG. 7 routine provides that to find out the tare remaining after operation of the partial tare compensator 24 (FIG. 1) with the routine of FIG. 4 running, the digital load signal at the top floor is stored in the remaining tare table. The empty car 2 moves from the top floor toward the bottom floor, step 88, and at each floor the digital load signal is read and stored in a remaining tare table, steps 90, 92. The points a,b,c,d,e,f,g of FIG. 6 are the points at which the digital load signal is measured. After the remaining tare table is complete, step 94 (FIG. 7), during normal operation, the digital load signal is read, step 96 (FIG. 9), at a floor, step 98, and the digital stored load signal corresponding to that floor is read and the payload calculated as the difference between the digital load signal and the digital stored load signal. In step 104, a car 2 may then be moved in response to the payload signal.

Thus, the ADC dynamic range requirements for hitch load weighing are reduced by providing tare compensation as a function of hoistway position. Tare remaining after correction of the routine of FIG. 4 is eliminated by measuring it and subtracting it out of the digital load signal in the routine of FIG. 9.

CALIBRATION

When tare in the load weight is being fully compensated, the load weighing system must be calibrated. FIG. 10 shows the software of the original calibration section 32. After START, step 120, the static tare is determined. This entails running car 2 while empty to the bottom of the hoistway 4, step 122, obtaining an estimated remaining tare and the digital load signal, step 124, and incrementing the DTCS via partial tare compensator 24 until the digital load signal from the ADC 20 is one bit less than the estimated remaining tare, steps 126, 128. Static tare is stored, step 129. Next, step 130, the car 2 is manually loaded with a calibration weight for calibrating the load weighing system of FIG. 1. Then, step 132, the $V_{ref}$ is adjusted until the digital load signal indicates the amount of weight in the car 2. Step 132 can be done by connecting the digital load signal to a digital display, comparing the digital load signal to a correct digital load signal, and incrementing a digital form of the reference voltage $V_{dref}$ until the digital load signal indicates the calibration weight. An extra 27% of the weight for a fully loaded car 2 in the calibration weight accounts for an overload in car 2. $V_{ref}$ is stored, step 136, for use in determining the recalibration standard, i.e., the dynamic tare result.

Following step 136, a standard for future calibration is obtained through steps 140–146. The goal in this recalibration scheme is to use the weight of the hoist ropes and traveling cable and other elements which make up the dynamic tare as the recalibration standard. Therefore, in step 140, DTCS is defined as the static tare, rather than as defined in step 84 (FIG. 4). Next, the car 2 is emptied of the calibration weights, step 141, and run to a second floor, at the top of the hoistway, step 142. The digital load signal is read and stored to be used as a recalibration standard, step 144. This value of the digital load signal is the dynamic tare at that second floor. In step 146, the DTCS is again defined as in step 84 (FIG. 1). Now, the dynamic tare is available for use as a recalibration standard.

Figure 11:
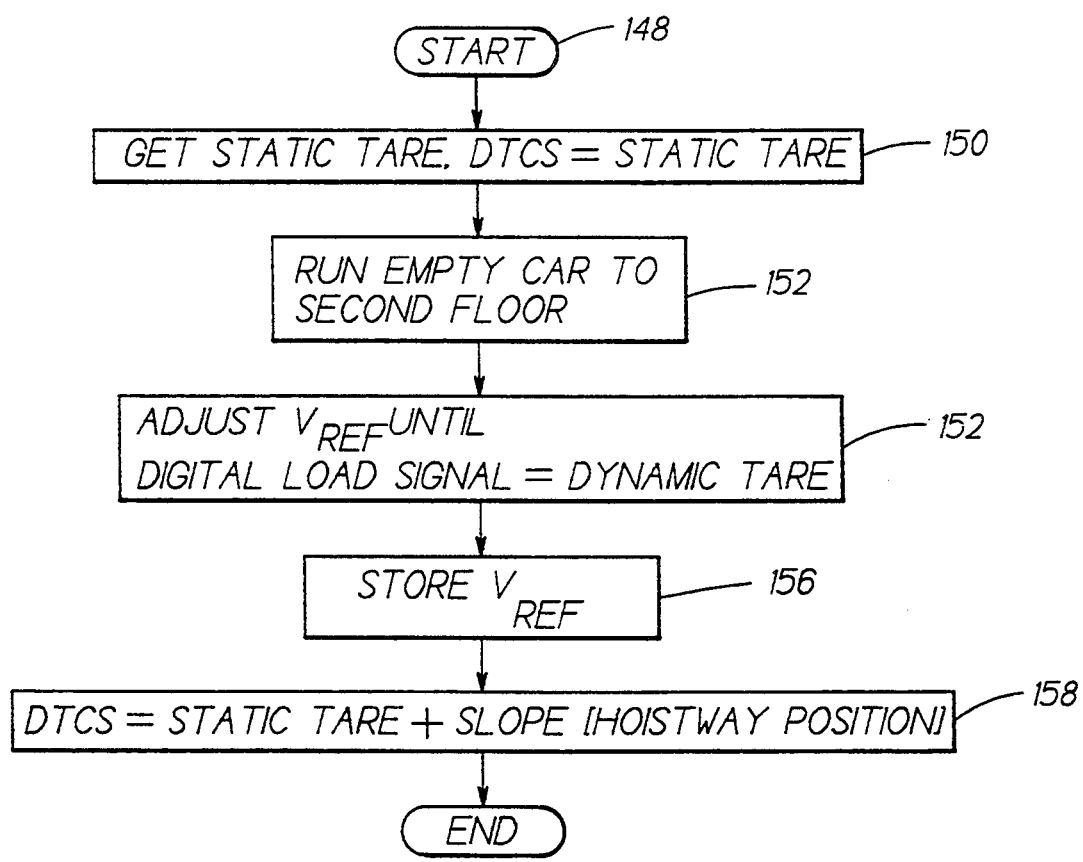
FIG. 11 is a flow chart for recalibrating the load weighing system of FIG. 1.

The routine of FIG. 11 is executed when the load weighing system of FIG. 1 needs to be recalibrated. The need for this may be indicated by roll back or roll forward. After a START, step 148, the static tare is obtained with the elevator car 2 empty, as explained in FIGS. 2, 10, and compensated for, as explained in FIG. 10, by giving DTCS a value equal to the static tare, step 150. The purpose of getting the static tare again after getting it in the routine of FIG. 10 is not because the static tare has changed but because the digital load signal may not still yield the correct static tare. Then, because the weight of the hoist ropes and traveling cable and other elements which make up the dynamic tare is to be used as the recalibration, standard DTCS is defined as the static tare, step 151. In step 152, the empty elevator car 2 is run to the same floor as in step 142 of FIG. 10. Then, the $V_{ref}$ is adjusted until it equals the value of the dynamic tare stored at step 144 of FIG. 10, step 156. $V_{ref}$ is stored for application to the ADC 20, step 158, and DTCS is again defined as in step 84 (FIG. 4).

The load weighing system at this point has been recalibrated without the use of a calibration weight. The routine of FIG. 11 may be reentered each time the load weighing system of FIG. 1 needs to be recalibrated.

Whereas the steps of FIG. 10 are taken separately from those in FIG. 2, they could be taken at the same time as those in FIG. 2. For example, the routine of FIG. 2 could accomplish all that is accomplished in the routines of FIG. 10 and FIG. 2 together if (a) after step 61 of FIG. 2, the car is loaded with calibration weights and $V_{ref}$ adjusted until the digital load signal indicates the calibration weight and that $V_{ref}$ is stored, and the calibration weights are then removed, and (b) after step 66 the value of the digital load signal is stored for use as a recalibration standard.

It should be understood by those skilled in the art that various changes, omissions, and additions may be made herein without departing from the spirit and scope of the invention.

We claim:

1. A method of calibrating an analog to digital converter within an elevator hitch load weighing system, comprising:

providing an analog load signal, indicative of the weight on an elevator load hitch, from a load sensor;

providing an analog to digital converter responsive to an analog reference signal and said analog load signal for providing a digital load signal;

providing dynamic tare of said elevator load weighing system based upon said analog load signal provided by said load sensor which is responsive to the weight on the elevator car hitch;

calibrating said analog to digital converter by adjusting said analog reference voltage until said digital load signal is equal to said dynamic tare.

2. The method of claim 1 wherein said step of measuring the dynamic tare includes:

moving an empty car to a first floor of a hoistway;

providing said analog to digital converter responsive to said analog load signal indicative of the weight on the elevator car hitch for providing the digital load signal of the load on the elevator hitch when the elevator is at said first floor;

providing said digital load signal at said first floor to a computer for providing a digital tare compensation signal;

providing said digital tare compensation signal to a digital to analog converter for providing an analog tare compensation signal;

summing said analog tare compensation signal with said analog load signal for providing a compensated analog load signal;

providing said compensated analog load signal to said analog to digital converter for providing a digital load signal;

comparing said digital load signal with an estimated remaining tare and adjusting the magnitude of said digital tare compensation signal until the magnitude of said digital load signal is less than said estimated remaining tare;

measuring and storing a first floor digital tare compensation signal;

moving said car to a second floor above said first floor;

measuring a digital load signal indicative of the weight on the hitch of said elevator hitch load weighing system.

* * * * *